US012594489B2

(12) United States Patent
Meng et al.

(10) Patent No.: US 12,594,489 B2
(45) Date of Patent: Apr. 7, 2026

(54) VISUAL GUIDANCE-BASED MOBILE GAME SYSTEM AND MOBILE GAME RESPONSE METHOD

(71) Applicant: GOERTEK INC., Shandong (CN)

(72) Inventors: Tiancui Meng, Shandong (CN); Songyang Li, Shandong (CN)

(73) Assignee: GOERTEK INC., Shandong (CN)

( * ) Notice: Subject to any disclaimer, the term of this patent is extended or adjusted under 35 U.S.C. 154(b) by 698 days.

(21) Appl. No.: 17/997,101

(22) PCT Filed: Nov. 7, 2020

(86) PCT No.: PCT/CN2020/127345
§ 371 (c)(1),
(2) Date: Oct. 25, 2022

(87) PCT Pub. No.: WO2021/232698
PCT Pub. Date: Nov. 25, 2021

(65) Prior Publication Data
US 2023/0256327 A1 Aug. 17, 2023

(30) Foreign Application Priority Data
May 18, 2020 (CN) .......................... 202010419061.7

(51) Int. Cl.
*A63F 13/42* (2014.01)
*A63F 13/213* (2014.01)
(52) U.S. Cl.
CPC ............ *A63F 13/213* (2014.09); *A63F 13/42* (2014.09)
(58) Field of Classification Search
CPC ............................... A63F 13/42; A63F 13/213
See application file for complete search history.

(56) References Cited

U.S. PATENT DOCUMENTS 7,561,143 B1 * 7/2009 Milekic ................... G06F 3/013
345/32
2012/0230547 A1 * 9/2012 Durnell ................. G06V 40/19
382/103
(Continued)

FOREIGN PATENT DOCUMENTS

CN 106598221 A 4/2017
CN 106774863 A 5/2017
(Continued)

OTHER PUBLICATIONS

Liao Kebing Liu Aiqun, Safety Ergonomics, Emergency Management Press, pp. 149-150, Jan. 2020.

*Primary Examiner* — David L Lewis
*Assistant Examiner* — Shauna-Kay Hall
(74) *Attorney, Agent, or Firm* — Ingrassia Fisher & Lorenz, LLP

(57) ABSTRACT

A visual guidance-based mobile game system (001) comprises a terminal (100) and a gamepad (200) connected with the terminal (100). The terminal (100) comprises a user interface module configured to receive an eye movement image and output a mobile game response. The mobile game system (001) further comprises a visual intelligent guidance module (210) and a data processing module (220) that are connected with the user interface module (120). The eye tracker converts the eye movement image into the eye tracking information. The visual intelligent guidance module (210) is configured to transmit the eye tracking information to the data processing module (220). The data processing module (220) is configured to determine a responsive instruction corresponding to the eye tracking information according to the eye tracking information, so as to guide a control point on a screen of the terminal according (Continued)

to the responsive instruction and complete the mobile game response.

6 Claims, 2 Drawing Sheets

(56) References Cited

U.S. PATENT DOCUMENTS

| | | | | |
|---|---|---|---|---|
| 2015/0130740 A1* | 5/2015 | Cederlund | ............. | G02B 27/01 |
| | | | | 345/173 |
| 2015/0185835 A1* | 7/2015 | Ma | ....................... | G06V 40/193 |
| | | | | 345/156 |
| 2016/0109947 A1* | 4/2016 | George-Svahn | ........ | G06F 3/014 |
| | | | | 345/156 |
| 2017/0169662 A1* | 6/2017 | Froy | .................. | G06Q 30/0261 |
| 2017/0235360 A1* | 8/2017 | George-Svahn | ..... | G02B 27/017 |
| | | | | 345/173 |
| 2019/0099660 A1* | 4/2019 | Nelson | ................ | A63F 3/00157 |

FOREIGN PATENT DOCUMENTS

| | | | |
|---|---|---|---|
| CN | 107066085 A | 8/2017 |
| CN | 107145226 A | 9/2017 |
| CN | 107562208 A | 1/2018 |
| CN | 108635840 A | 10/2018 |
| CN | 108704308 A | 10/2018 |
| CN | 108985210 A | 12/2018 |
| CN | 110465085 A | 11/2019 |
| CN | 110555426 A | 12/2019 |
| CN | 110837294 A | 2/2020 |
| CN | 111632367 A | 9/2020 |

* cited by examiner

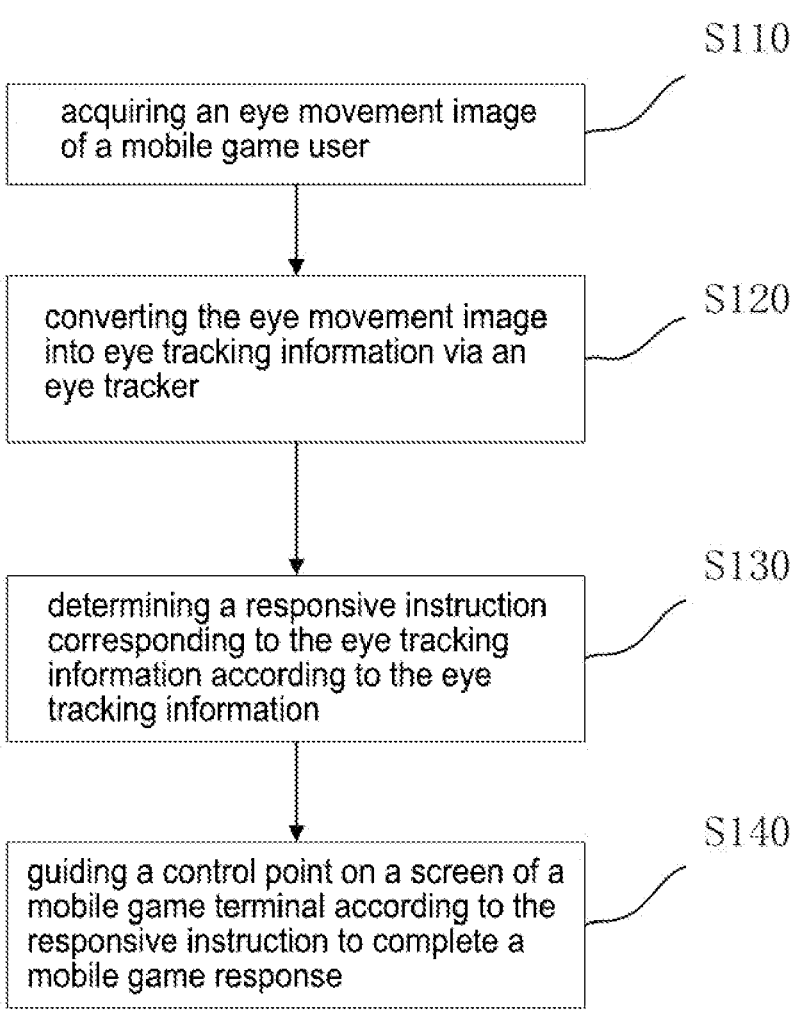

S110 acquiring an eye movement image of a mobile game user

S120 converting the eye movement image into eye tracking information via an eye tracker

S130 determining a responsive instruction corresponding to the eye tracking information according to the eye tracking information

S140 guiding a control point on a screen of a mobile game terminal according to the responsive instruction to complete a mobile game response

Fig. 2

VISUAL GUIDANCE-BASED MOBILE GAME SYSTEM AND MOBILE GAME RESPONSE METHOD

CROSS-REFERENCE TO RELATED APPLICATIONS

This application is a U.S. National-Stage entry under 35 U.S.C. § 371 based on International Application No. PCT/CN2020/127345, filed Nov. 7, 2020 which was published under PCT Article 21(2) and which claims priority to Chinese Application No. 202010419061.7, filed May 18, 2020, which are all hereby incorporated herein in their entirety by reference.

TECHNICAL FIELD

This application pertains to the field of visual guidance, more specifically, relates to a visual guidance-based mobile game system and mobile game response method.

BACKGROUND

With the advancement of science and technology, more and more mobile games become popular all over the world. However, the current manufacturers of gamepads relating to mobile games mostly rely on mapping to support mobile games, namely, the keys on a gamepad are simulated as touch points on a screen, and when the keys are pressed, the mapping on the screen will simulate an operation of touching the screen. However, at present, on the gamepads for mobile games, except for the keys and joystick, only the vibration of somatosensory games can bring fresh feelings. The current gamepads for mobile games still cannot match with many advanced mobile games. Take somatosensory games as an example, somatosensory games rely on fast video capture technology to instantly reflect the player's body actions into the game, and push the game forward by sensing the actions of human body. This kind of games has been gradually favored by consumers. However, somatosensory games that rely on limbs require the human body to make actions with large amplitude, and thus are more suitable for playing in spacious scenarios and not suitable for playing in sitting or lying positions. Therefore, the traditional games only use monotonous keys and joystick to control mobile games, which is boring and not interesting. On the other hand, large-scale somatosensory games need spacious scenarios, and are not very applicable.

Therefore, there is an urgent need for a mobile game solution that can realize interesting entertainment even lying in a narrow space and can meet the game needs of the disabled. In addition, other objects, desirable features and characteristics will become apparent from the subsequent summary and detailed description, and the appended claims, taken in conjunction with the accompanying drawings and this background.

SUMMARY

In view of the above problems, the object of the present disclosure is to provide a visual guidance-based mobile game system and mobile game response method to solve the problems that the existing gamepads are monotonous and boring and can only be manually controlled by using keys and joystick, and that the somatosensory game can only be played in an open and large space and the interesting entertainment cannot be realized while lying in a narrow space.

The present disclosure provides a visual guidance-based mobile game system, comprising a terminal and a gamepad connected with the terminal, wherein the terminal is provided thereon with an image acquisition device configured to acquire an eye movement image of a mobile game user;

the terminal comprises a user interface module configured to receive the eye movement image and output a mobile game response;

the mobile game system comprises an eye tracker;

the mobile game system comprises a visual intelligent guidance module and a data processing module that are connected with the user interface module;

the eye tracker converts eye movement images into eye tracking information;

the visual intelligent guidance module is configured to transmit the eye tracking information to the data processing module;

the data processing module is configured to determine a responsive instruction corresponding to the eye tracking information according to the eye tracking information, so as to guide a control point on a screen of the terminal according to the responsive instruction and complete the mobile game response.

Preferably, the visual intelligent guidance module comprises an image processing unit configured to convert the eye movement image into a gray-scale image and an edge extraction unit configured to extract the eye tracking information from the gray-scale image.

Preferably, the edge extraction unit comprises an eye contour feature extraction sub-unit, an iris contour feature extraction sub-unit and an iris center point movement deviation calculation sub-unit;

the eye contour feature extraction sub-unit is configured to lock an eye part of the mobile game user;

the iris contour feature extraction sub-unit is configured to perform iris center point positioning on the eye part;

the iris center point movement deviation calculation sub-unit is configured to determine a movement deviation $(X_p, Y_p)$ of an iris center point by $(X_p, Y_p) = (X_1, Y_1) - (X_0, Y_0)$, where $(X_0, Y_0)$ is coordinates of the iris center point when it is at a center of the eye part, and $(X_1, Y_1)$ is coordinates of the iris center point after movement.

Preferably, the gamepad is provided thereon with physical keys, and the physical keys include a key and a joystick.

Preferably, the gamepad further comprises a normal operation module, and the normal operation module is configured to convert physical information generated by the physical key into touch information, and transmit the touch information to the data processing module, so that the data processing module sends a normal responsive instruction to the terminal.

Preferably, the mobile game response includes mobile game character control, mobile game environment rendering and user fatigue reminder.

The present disclosure also provides a visual guidance-based mobile game response method, comprising:

acquiring an eye movement image of a mobile game user;

converting the eye movement image into eye tracking information via an eye tracker;

determining a responsive instruction corresponding to the eye tracking information according to the eye tracking information; and guiding a control point on a screen of a mobile game terminal according to the responsive instruction to complete a mobile game response.

Preferably, the method further comprises:

converting physical information collected via a physical key into touch information; and determining a responsive instruction corresponding to the touch information according to the touch information.

Preferably, in a process of converting the eye movement image into the eye tracking information, the eye movement image is converted into a gray-scale image, and then the eye tracking information is extracted from the gray-scale image.

Preferably, a process of extracting eye tracking information from the gray image comprises:

locking an eye part in the gray-scale image;

positioning an iris center point in the gray-scale image to determine a movement deviation $(X_p, Y_p)$ of the iris center point by $(X_p, Y_p)=(X_1, Y_1)-(X_0, Y_0)$, where $(X_0, Y_0)$ is coordinates of the iris center point when it is at a center of the eye part, and $(X_1, Y_1)$ is coordinates of the iris center point after movement; and quickly assembling data of all movement deviations $(X_p, Y_p)$ of the iris center point in the gray-scale image to form the eye tracking information.

It can be seen from the above technical solution that, in the visual guidance based mobile game system and mobile game response method according to the present disclosure, by providing the eye tracker, after the mobile game terminal is connected with the mobile game gamepad, the image acquisition device on the mobile game terminal acquires the eye movement image of the mobile game user; the eye tracker converts the eye movement image into eye tracking information; the visual intelligent guidance module on the gamepad transmits the eye tracking information to the data processing module; the data processing module analyzes and processes the eye tracking information to obtain the responsive instruction, and guides the touch point on the terminal screen according to the responsive instruction to complete the mobile game response. Namely, the mobile game user can control the mobile game by moving his eyes, which not only enriches the game operation, but also experiences the fun of somatosensory games in a narrow space possible. Moreover, it provides a new way of game entertainment for the disabled to enrich their lives. In addition, it can detect the user's gaze time on game screen and analyze the degree of eye fatigue, so as to intelligently remind the user to reasonably manage the game playing time and protect the eyesight of mobile game user.

BRIEF DESCRIPTION OF DRAWINGS

The present invention will hereinafter be described in conjunction with the following drawing figures, wherein like numerals denote like elements, and:

FIG. 2 is a flowchart of a visual guidance-based mobile game response method according to an embodiment of the present disclosure.

DETAILED DESCRIPTION

Figure 1:
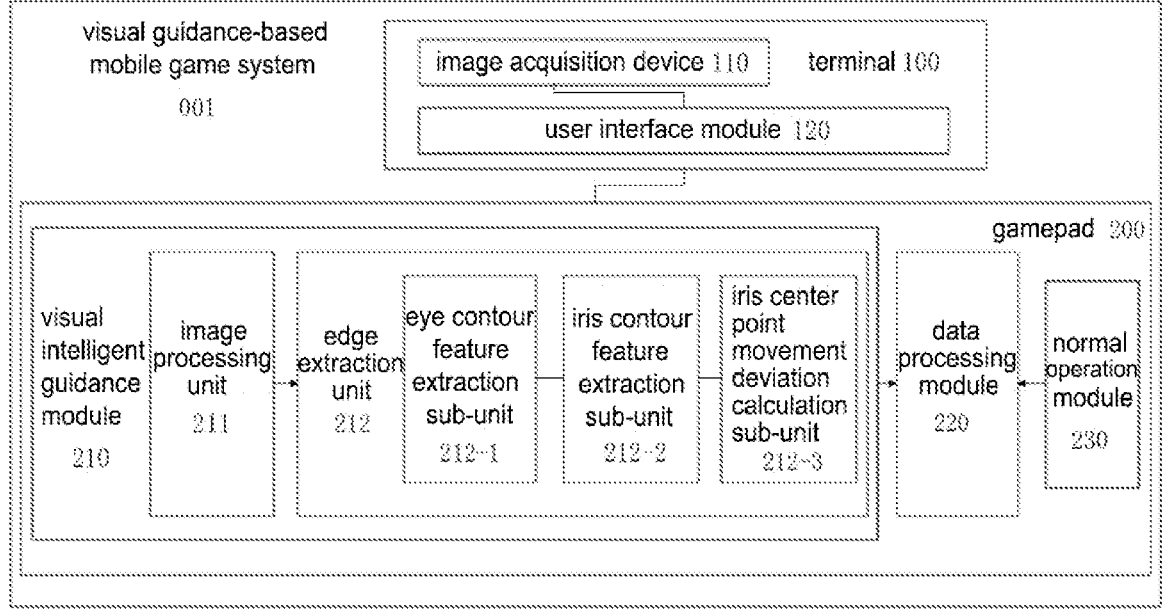
FIG. 1 is a schematic diagram of a visual guidance-based mobile game system according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

On the traditional mobile game gamepads, except for the keys and joystick, only the vibration of somatosensory games can bring fresh feelings. The somatosensory games push the game forward by sensing the actions of the human body. However, somatosensory games that rely on limbs require the human body to make actions with large amplitude which are more suitable for playing in spacious scenarios and not suitable for playing in sitting or lying positions. Therefore, there is a lack of a mobile game gamepad that can experience the fun of games even lying in a narrow space and can provide entertainment for the disabled.

With respect to the above problems, the present disclosure provides a visual guidance-based mobile game system. The specific embodiments of the present disclosure will be described in detail below in conjunction with the accompanying drawings.

In order to explain the visual guidance-based mobile game system according to the present disclosure, please refer to FIG. 1 which illustrates the system structure of the visual guidance based mobile game system according to an embodiment of the present disclosure.

The following description of the exemplary embodiments is in fact only illustrative and in no way serves as any limitation on the present disclosure and its application or use. The technology and equipment known to those skilled in the relevant field may not be discussed in detail, but when appropriate, these technology and equipment shall be regarded as a part of the specification.

As shown in FIG. 1, the visual guidance-based mobile game system 001 according to the present disclosure comprises a terminal 100 and a gamepad 200 connected with the terminal 100. The terminal 100 is not particularly limited, and may be a mobile phone, a tablet, or any mobile terminal with game functions. In this embodiment, a mobile phone is used. The specific type of the gamepad 200 is not particularly limited. It may be of a traditional gamepad style, or be a rod type or a pad type. In this embodiment, the traditional handle gamepad is still used, which conforms to ergonomics and is convenient for users to grip. In this embodiment, the gamepad comprises an L gamepad and an R gamepad for two people use, and two people may cooperate and play the game to increase the fun of the game. The coupling mode between the gamepad 200 and the terminal 100 is not particularly limited, and may be any coupling mode capable of transmitting data. In this embodiment, the gamepad 200 and the terminal 100 are directly or indirectly connected through BLE or WiFi to facilitate data transmission between the gamepad 200 and the terminal 100.

As shown in FIG. 1, the visual guidance-based mobile game system 001 according to the present disclosure is provided with an image acquisition device 110 on the terminal 100. The image acquisition device 110 is configured to acquire an eye movement image of a mobile game user. The image acquisition device 110 is not particularly limited, and includes but is not limited to a camera. In this embodiment, the image acquisition device 110 is a camera. When the mobile game is turned on, the user may use his eyes to control the scene and character action in the game, and the eye actions are captured by the image acquisition device 110. When the user turns on the mobile game, the image acquisition device starts to work to acquire an eye movement image of the mobile game user. The mobile game system 001 is equipped with an eye tracker, which is connected with a user interface module 120 to track the gaze direction of the user's eyes. The mobile game system 001 further comprises a visual intelligent guidance module 210 and a data processing module 220 that are connected with the user interface module 120. The visual intelligent guidance module 210 is configured to transmit the eye tracking information to the data processing module 220, and finally output the behavior of the eyeball. When the eyes look at different directions, there will be different movement behaviors of the eye part, and the visual intelligent guidance module 210 can accurately capture these behaviors. The eye tracker, the visual intelligent guidance module 210 and the data processing module 220 may be disposed on the terminal or on the gamepad.

In the visual guidance-based mobile game system 001 shown in FIG. 1, the terminal 100 comprises a user interface module 120, which acts as an intermediary between the user, the gamepad and the terminal, that is, the user can act on the user interface module 120 or receive information from the user interface module 120. The specific structure of the user interface module 120 is not particularly limited, and may be a combination of a screen on the terminal 100 and a transmission component of the terminal 100. It is configured to transmit data between the terminal and the gamepad, and output a mobile game response. The mobile game response is not particularly limited. In this embodiment, the mobile game response includes mobile game character control, mobile game environment rendering and user fatigue reminder. The rendering of the game environment within the visual range can reduce the game response time and improve the user satisfaction. The user interface module 120 is further configured to assist in collecting eye movement images (the specific collection operation is completed by the image acquisition device) and feedbacks. Specifically, when the user stares at the screen to move his eyes, this movement is instantly captured by the image acquisition device 110. In addition, the feedback information of the game on the user's operation content may also be displayed via the user interface module 120. For example, the user may be reminded, via the user interface module 120, of the information such as that the game playing time is too long by way of voice reminder or mobile screen display, to preventing visual fatigue.

When the eye tracker, the visual intelligent guidance module 210 and the data processing module 220 are disposed on the terminal, the eye tracker converts the eye movement image collected by the image acquisition device into eye tracking information, the visual intelligent guidance module 210 is configured to transmit the eye tracking information to the data processing module 220, and the data processing module 220 is configured to determine a responsive instruction corresponding to the eye tracking information according to the eye tracking information, guide a control point on a screen of the terminal according to the responsive instruction, and transmit the responsive instruction to the user interface module to send it to the gamepad 200 to complete the mobile game response.

When the eye tracker, the visual intelligent guidance module 210 and the data processing module 220 are disposed on the gamepad, the eye tracker converts the eye movement image received by the user interface module 120 into eye tracking information, the visual intelligent guidance module 210 transmits the eye tracking information to the data processing module 220, and the data processing module is configured to determine a responsive instruction corresponding to the eye tracking information according to the eye tracking information, transmit the responsive instruction to the user interface module to guide the control point on a screen of the terminal to complete the mobile game response.

Specifically, in the present disclosure, it is explained by taking the case where the eye tracker, the visual intelligent guidance module 210 and the data processing module 220 are disposed on the gamepad as an example. In the visual guidance-based mobile game system 001 shown in FIG. 1, an eye tracker is built in the gamepad 200 to track the gaze direction of the user's eyes. The gamepad 200 comprises a visual intelligent guidance module 210 and a data processing module 220 that are coupled with the user interface module 120 on the terminal 100. The visual intelligent guidance module 210 is configured to convert the eye movement image received by the user interface module 120 into eye tracking information via the eye tracker, and transmit the eye tracking information to the data processing module 220, that is, to process the image data transmitted from the terminal 100, and finally output the eye behavior. When human eyes look at different directions, there will be different movement behaviors of the eye part, and the visual intelligent guidance module 210 can accurately capture these behaviors.

In the visual guidance-based mobile game system 001 shown in FIG. 1, the visual intelligent guidance module 210 may further comprise an image processing unit 211 and an edge extraction unit 212. The image processing unit 211 is configured to convert the eye movement image into a gray-scale image, and the edge extraction unit 212 is configured to extract the eye tracking information from the gray-scale image. Generally, the data collected by the image acquisition device 110 is mostly color image data, which has a large amount of data. If it is directly processed, a large and unnecessary amount of calculation will be generated, which will affect the real-time performance of the system. Therefore, in this embodiment, the color image data is first converted into a gray-scale image by means of the gray-scale transformation technology, so as to reduce the amount of calculation data. In other words, the eye movement image is first converted into a gray-scale image, and then the gray-scale image is calculated, which greatly reduces the subsequent unnecessary calculation, improves the calculation speed, and makes the game experience smoother.

In the visual guidance-based mobile game system 001 shown in FIG. 1, the edge extraction unit 212 is configured to perform relevant calculation and processing on the gray image. Specifically, the eye behavior is the behavior of the eyeball, i.e., the movement behavior of the pupil relative to the eye contour. Since the position of the gamepad is random relative to the human head, it mainly involves eye contour feature extraction, iris contour feature extraction, and iris center point movement deviation.

Specifically, the purpose of eye contour feature extraction is to quickly find the eye part to facilitate the subsequent iris contour feature extraction. The eye contour feature extraction is generally realized by edge extraction, and the specific implementation mode is not limited. In this embodiment, it is realized by methods such as Canny operator and Sobel operator. The purpose of iris contour feature extraction is to locate the central point of the pupil. The specific method of locating the central point of the pupil is not limited, and the pupil feature extraction method or the iris feature extraction method may be used. The pupil becomes larger or smaller under the influence of light, and the pupil is smaller relative to the iris. In the case of black eyes, the colors of pupil and iris are not much different. As the iris and the pupil are concentric circles or approximate concentric circles, in this embodiment, the position of the pupil center point is determined by extracting the iris contour feature. The method of extracting the iris contour feature is not particularly limited. In this embodiment, the iris contour is detected first by using Hough transform, Canny operator or the like, and then the iris center point is calculated. The movement deviation of the iris center point can reflect the movement behavior of the eye. The position of the iris center point is the position (X, Y) relative to the eye contour. When used, it needs to be calibrated first. The calibration method is as follows. When the iris center point is at the center of the eye (i.e., it is at the center of the eye contour), the position coordinates of the center is found by means of the iris contour feature extraction and calibrated as $(X_0, Y_0)$. When the eye moves, the position coordinates $(X_1, Y_1)$ of the iris center point relative to the eye contour after movement is calculated, and finally the movement deviation $(X_p, Y_p)$ of the iris center point is calculated by $(X_p, Y_p)=(X_1, Y_1)-(X_0, Y_0)$.

Therefore, in a specific embodiment of the present disclosure, in the visual guidance-based mobile game system 001 shown in FIG. 1, the edge extraction unit 212 further comprises an eye contour feature extraction sub-unit 212-1, an iris contour feature extraction sub-unit 212-2, and an iris center point movement deviation calculation sub-unit 212-3. The eye contour feature extraction sub-unit 212-1 is configured to quickly lock the eye part of the mobile game user. The iris contour feature extraction sub-unit 212-2 is configured to perform iris center point positioning on the eye part. The iris center point movement deviation calculation sub-unit 212-3 is configured to determine the movement deviation $(X_p, Y_p)$ of the iris center point by $(X_p, Y_p)=(X_1, Y_1)-(X_0, Y_0)$, where $(X_0, Y_0)$ is the position coordinates of the iris center point when it is at the center of the eye part, and $(X_1, Y_1)$ is the position coordinates of the iris center point after movement. Specifically, the iris center point movement deviation calculation sub-unit 212-3 first calibrates the position of the iris center point when it is at the center of the eye part as $(X_0, Y_0)$, marks the position coordinates of the iris center point after movement as $(X_1, Y_1)$ (as mentioned above, the coordinates of the iris center here are the coordinates of the iris center relative to the eye contour, such as the coordinates in the middle of the eye part, the coordinates on two sides deviating from the middle of the eye part, etc.), and then calculates the movement deviation $(X_p, Y_p)$ of the iris center point by $(X_p, Y_p)=(X_1, Y_1)-(X_0, Y_0)$ to obtain the eye movement behavior data, that is, to obtain the eye tracking information.

In the visual guidance-based mobile game system shown in FIG. 1, the gamepad 200 comprises a data processing module 220, which is configured to determine a responsive instruction corresponding to the eye tracking information according to the eye tracking information, and transmit the responsive instruction to the user interface module 120 to guide a control point on the screen of the terminal 100 to complete the mobile game response. Specifically, the data processing module 220 analyzes and processes the eye features of the user at different moments in the eye tracking information, so as to track the changes of the eyes in real time, predict the user's status and needs, and make a response, so as to control the game scene with the eyes. In addition, the data processing module 220 may also analyze the data in the eye tracking information to determine whether the user's eyes are in a fatigue state. The data processing module 220 calibrates the touch information for controlling the screen of the terminal in combination with the eye tracking information, intelligently responds to the user's eye movement request, sends the responsive instruction to the user interface module 120, and transmits the response information to the user via the user interface module 120, so as to realize the user's control on the game character, render the game environment within the vision range, and remind the user to reasonably play games and protect his eyesight.

In addition, in the visual guidance-based mobile game system 001 shown in FIG. 1, the gamepad 200 is provided thereon with physical keys which include a key and a joystick. In other words, the gamepad still comprises the traditional physical key, so that the mobile game can be controlled by normal operations as well as by the eyes. Therefore, the gamepad 200 also comprises a normal operation module 230, which is configured to convert the physical information generated by the physical key into touch information, and transmit the touch information to the data processing module 220, so that the data processing module 220 sends a normal responsive instruction to the terminal 100. Moreover, the normal operation module 230 sends a request made by the user's hand movement to the data processing module in the form of touch information in order of priority. For example, if the user sends an interrupt request by means of the physical key hand movement, the normal operation module 230 recognizes the user's request, firstly judge whether the interrupt request is legal, and if it is legal, then analyze and compare the priority of the request, and process it according to the priority. In this way, the normal operation module 230 sends the request to the data processing module in an orderly manner according to the priority of the request. The user can not only control the mobile game by eye movements, but also control the mobile game by normal physical operations; moreover, the eye control is compatible with the normal operation control, thereby improving the practicality and smoothness of mobile games.

It can be seen from the above embodiments that, in the visual guidance based mobile game system according to the present disclosure, the eye tracker is built in the mobile game gamepad. After the mobile game terminal is coupled with the mobile game gamepad, the image acquisition device on the mobile game terminal acquires the eye movement image of the mobile game user, and the visual intelligent guidance module on the gamepad converts the eye movement image in the user interface module into eye tracking information via the eye tracker, and transmits the eye tracking information to the data processing module. The data processing module analyzes and processes the eye tracking information to obtain the responsive instruction, and transmits the responsive instruction to the terminal to guide the touch point on the screen of the terminal to complete the mobile game response. Namely, the mobile game user can control the mobile game by moving his eyes, which not only enriches the game operation, but also experiences the fun of somatosensory games in a narrow space possible. Moreover, it provides a new way of game entertainment for the disabled to enrich their lives. In addition, it can detect the user's gaze time on game screen and analyze the degree of eye fatigue, so as to intelligently remind the user to reasonably manage the game playing time and protect the eyesight of mobile game user. In addition, the rendering of the regional game environment within the vision range in the user interface module can reduce the game response time and improve the user satisfaction.

As shown in FIG. 2, corresponding to the visual guidance-based mobile game system described above, the present disclosure also provides a visual guidance-based mobile game response method, comprising:

S110: acquiring an eye movement image of a mobile game user;

S120: converting the eye movement image into eye tracking information via an eye tracker;

S130: determining a responsive instruction corresponding to the eye tracking information according to the eye tracking information; and

S140: guiding a control point on a screen of a mobile game terminal according to the responsive instruction to complete a mobile game response.

The eye movement image of the mobile game user acquired in step S110, i.e., the image of the user's eye when the mobile game user operates the mobile game with his eyes, is generally a color image.

In step S120, in the process of converting the eye movement image into eye tracking information, the eye movement image is firstly converted into a gray-scale image, and then the eye tracking information is extracted from the gray-scale image, so as to reduce the unnecessary calculation amount in the eye tracking information extraction process, improve the calculation speed, and make the game experience smoother.

In step S120, the process of extracting eye tracking information from the gray-scale image comprises: first, locking the eye part in the gray-scale image; then, positioning the iris center point (in the eye part) in the gray-scale image to determine a movement deviation $(X_p, Y_p)$ of the iris center point by $(X_p, Y_p)=(X_1, Y_1)-(X_0, Y_0)$, where $(X_0, Y_0)$ is coordinates of the iris center point when it is at the center of the eye part, and $(X_1, Y_1)$ is coordinates of the iris center point after movement. Specifically, first, the position of the iris center point at the center of the eye part is calibrated as $(X_0, Y_0)$, and then the position of the iris center point after movement relative to the eye part is marked (i.e., to determine where the iris center point is in the eye part) as $(X_1, Y_1)$; then, the movement deviation $(X_p, Y_p)$ of iris center point is calculated by $(X_p, Y_p)=(X_1, Y_1)-(X_0, Y_0)$; finally, the calculated data of all movement deviations $(X_p, Y_p)$ of the iris center point are quickly assembled to form the eye tracking information, thereby obtaining the user's eye movement data more accurately.

In S130, a responsive instruction is generated according to the eye tracking information. First, the eye features of the user at different moments in the eye tracking information are analyzed and processed, so as to track the changes of the eyes in real time, predict the user's status and needs, and make a response, so as to control the game scene with the eyes. In addition, when analyzing the data in the eye tracking information, it may also be determined whether the user's eyes are in a fatigue state. Thus, not only instructions to control the characters and atmosphere of the mobile game but also instructions to remind users of eye conditions can be generated, so as to remind users to properly play the mobile game and protect their eyesight.

In S140, the mobile game response is not particularly limited. In this embodiment, the mobile game response includes mobile game character control, mobile game environment rendering and user fatigue reminder. Rendering the game environment within the visual range can reduce the game response time and improve the user's satisfaction. In addition, it can remind the user that the game playing time is too long and attention should be paid to preventing visual fatigue by way of voice reminder or mobile phone screen display, thereby improving the user satisfaction.

The visual guidance-based mobile game response method as shown in FIG. 2 further comprises: converting physical information collected via a physical key into touch information; and determining a responsive instruction corresponding to the touch information according to the touch information. Specifically, the user operates the physical key on the gamepad, firstly converts the physical key hand movement into touch information, and then generates the corresponding responsive instruction according to the touch information, so as to guide a control point on the screen of the mobile game terminal according to the responsive instruction to complete the mobile game response. In this way, the user can not only control the mobile game by eye movements, but also control the mobile game by normal physical operations; moreover, the eye control is compatible with the normal operation control, thereby improving the practicality and smoothness of mobile games.

It can be seen from the above embodiments that, the visual guidance-based mobile game response method according to the present disclosure operates the mobile game by combining eye movements and hand movements, and provides a new and healthy game entertainment mode for mobile game users. The mobile game can be controlled by eye movements, which not only enriches the game operation, but also experiences the fun of somatosensory games in a narrow space possible. Moreover, it provides a new way of game entertainment for the disabled to enrich their lives. In addition, the intelligent fatigue reminder function helps users to play games in a health way and protect their eyesight. At the same time, the rendering of the regional game environment within the vision range can reduce the game response time and improve the user satisfaction.

The visual guidance-based mobile game system and mobile game response method according to the present disclosure have been described above by way of example with reference to the accompanying drawings. However, it should be understood by those skilled in the art that various improvements can be made on the mobile game system and the visual guidance-based mobile game response method according to the present disclosure without departing from the content of the present disclosure. Therefore, the protection scope of the present disclosure should be determined by the content of the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A visual guidance-based mobile game system, comprising a terminal and a gamepad connected with the terminal, wherein the terminal is provided thereon with an image acquisition device configured to acquire an eye movement image of a mobile game user;

the terminal comprises a user interface module configured to receive the eye movement image and output a mobile game response;

the mobile game system comprises an eye tracker;

the mobile game system comprises a visual intelligent guidance module and a data processing module that are connected with the user interface module;

the eye tracker converts the eye movement image into eye tracking information;

the visual intelligent guidance module is configured to transmit the eye tracking information to the data processing module;

the data processing module is configured to determine a responsive instruction corresponding to the eye tracking information according to the eye tracking information, so as to guide a control point on a screen of the terminal according to the responsive instruction and complete the mobile game response, the visual intelligent guidance module comprises an image processing unit configured to convert the eye movement image into a gray-scale image and an edge extraction unit configured to extract the eye tracking information from the gray-scale image, wherein the edge extraction unit comprises an eye contour feature extraction sub-unit, an iris contour feature extraction sub-unit and an iris center point movement deviation calculation sub-unit;

the eye contour feature extraction sub-unit is configured to lock an eye part of the mobile game user;

the iris contour feature extraction sub-unit is configured to perform iris center point positioning on the eye part; and the iris center point movement deviation calculation sub-unit is configured to determine a movement deviation $(X_p, Y_p)$ of an iris center point by $(X_p, Y_p)=(X_1, Y_1)-(X_0, Y_0)$, where $(X_0, Y_0)$ is coordinates of the iris center point when it is at a center of the eye part, and $(X_1, Y_1)$ is coordinates of the iris center point after movement.

2. The visual guidance-based mobile game system according to claim 1, wherein the gamepad is provided thereon with physical keys; and the physical keys include a key and a joystick.

3. The visual guidance-based mobile game system according to claim 2, wherein the gamepad further comprises a normal operation module, and the normal operation module is configured to convert physical information generated by the physical key into touch information, and transmit the touch information to the data processing module, so that the data processing module sends a normal responsive instruction to the terminal.

4. The visual guidance-based mobile game system according to claim 1, wherein the mobile game response includes mobile game character control, mobile game environment rendering and user fatigue reminder.

5. A visual guidance-based mobile game response method, comprising:

acquiring an eye movement image of a mobile game user;

converting the eye movement image into eye tracking information via an eye tracker;

determining a responsive instruction corresponding to the eye tracking information according to the eye tracking information; and guiding a control point on a screen of a mobile game terminal according to the responsive instruction to complete a mobile game response, the process of converting the eye movement image into the eye tracking information comprises: converting the eye movement image into a gray-scale image first, and then extracting the eye tracking information from the gray-scale image, wherein the process of extracting the eye tracking information from the gray-scale image comprises:

locking an eye part in the gray-scale image;

positioning an iris center point in the gray-scale image to determine a movement deviation $(X_p, Y_p)$ of the iris center point by $(X_p, Y_p)=(X_1, Y_1)-(X_0, Y_0)$, where $(X_0, Y_0)$ is coordinates of the iris center point when it is at a center of the eye part, and $(X_1, Y_1)$ is coordinates of the iris center point after movement; and quickly assembling data of all movement deviations $(X_p, Y_p)$ of the iris center point in the gray-scale image to form the eye tracking information.

6. The visual guidance-based mobile game response method according to claim 5, further comprising:

converting physical information collected via a physical key into touch information; and determining a responsive instruction corresponding to the touch information according to the touch information.

* * * * *